Nov. 24, 1936.  A. J. FRENCH  2,061,653
ANTIFRICTION BEARING
Filed June 27, 1932  2 Sheets-Sheet 1

INVENTOR
Allen J. French
BY
ATTORNEY

Nov. 24, 1936.　　　A. J. FRENCH　　　2,061,653
ANTIFRICTION BEARING
Filed June 27, 1932　　2 Sheets-Sheet 2

INVENTOR
Allen J. French
BY
ATTORNEY

Patented Nov. 24, 1936

2,061,653

UNITED STATES PATENT OFFICE 2,061,653

ANTIFRICTION BEARING

Allen J. French, St. Paul, Minn.

Application June 27, 1932, Serial No. 619,364

1 Claim. (Cl. 308—206)

My invention relates to improvements in antifriction bearings.

An object of my invention is particularly to provide a construction of roller bearings for rotating shafts, so synchronized in the rotation of the balls or rollers with respect to the rotation of the shaft as to essentially eliminate friction existing in connection with the ordinarily used roller or ball bearing.

To this end my invention consists of the features of construction and combination hereinafter particularly described and claimed.

Figure 1:
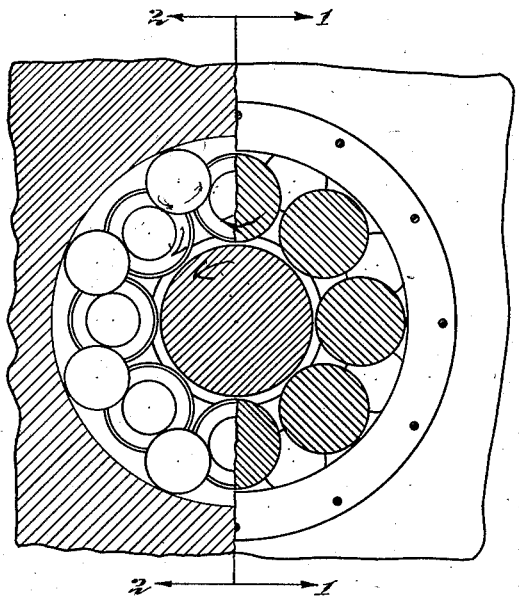
Figure 1 is a side view of the bearing and associated shaft, shown partly broken away, and in section, to illustrate the arrangement of the balls or rollers.

Referring to the drawings in detail, 1 represents an ordinary shaft. In the form shown in Figures 1 and 2, the housing for the bearing comprises two side walls 2, each side wall being interiorly formed with a circumferential track channel 3, concentric with the shaft. Supported between the walls 2 are a plurality of relatively large, loose rollers 4, each roller being formed with a flanged end 5 fitted within the channel 3. Rollers 4, as shown, are preferably convex, and contact with a concaved sleeve 6 surrounding the shaft. A plurality of relatively small rollers 7 are loosely positioned within the channel to contact with the outer edges of the flanged ends of the rollers. The flanged ends of the rollers are preferably convexed on their outer edges to fit the concaved edge of the rollers 7.

Figure 2:
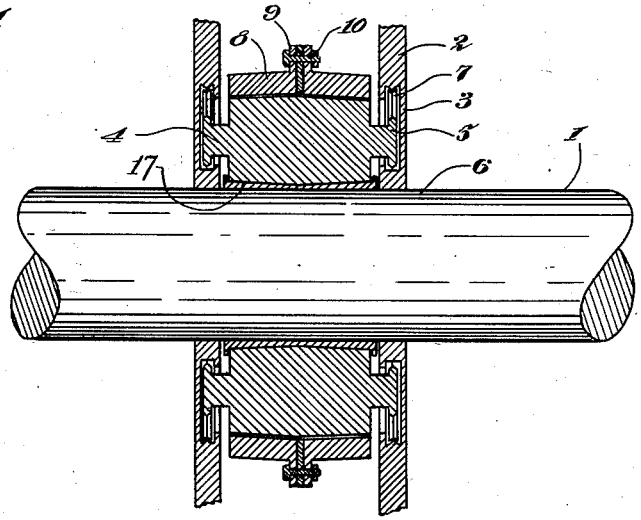
Figure 2 is a section on the line 2—1 of Figure 1.

I provide an enclosing ring 8 for the rollers, the enclosing ring being, as shown in Figure 2, formed with corresponding halves with flanged edges 9 connected as by bolts 10, thereby permitting the movability of the ring to bring about the insertion or removal of the balls or rollers. The ring 8, being, as shown, unconnected with the side walls, constitutes a floating or free surrounding housing member for the rollers or balls.

Figure 3:
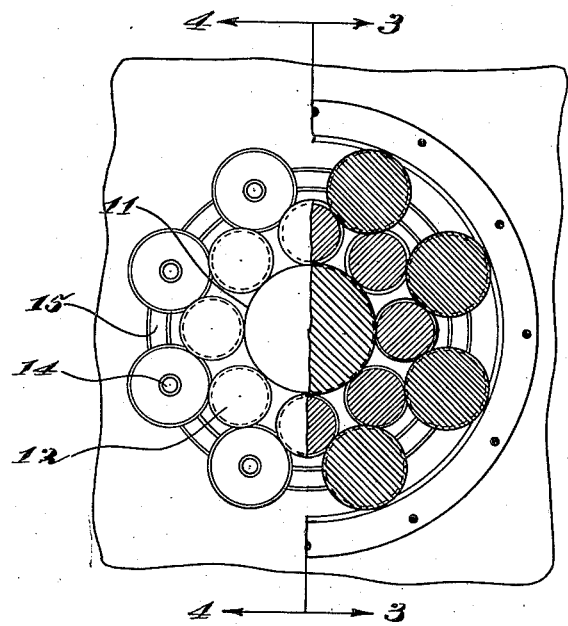
Figure 3 is a view corresponding to Figure 1, of a modified construction.
Figure 4:
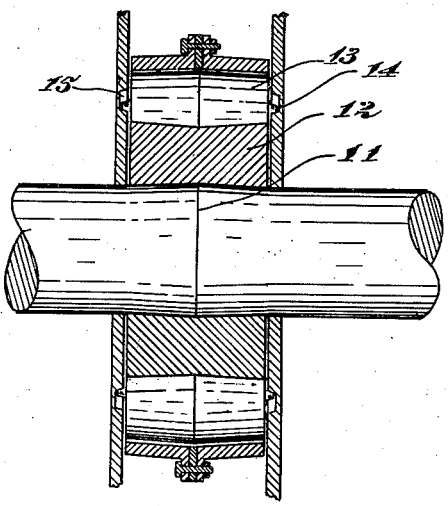
Figure 4 is a section on the line 4—3 of Figure 3.

In the form illustrated in Figures 3 and 4, instead of having small rollers engaging with the flanged outer edges of the large rollers, I provide a pair of loose rollers entirely surrounding the shaft between the side walls of the casing. In this modified form, the shaft is shown formed with a convex portion 11 and a plurality of loose rollers 12 surround the shaft, the rollers being positioned between the walls of the casing and being concaved, as shown, to fit the convexity of the shaft; self-centralizing being brought about by the cooperating concavity and convexity of the shaft and rollers.

A second set of rollers 13 are arranged outside the rollers 12 and are formed with trunnions 14 projecting into a track channel 15 in the side walls of the casing.

Figure 5:
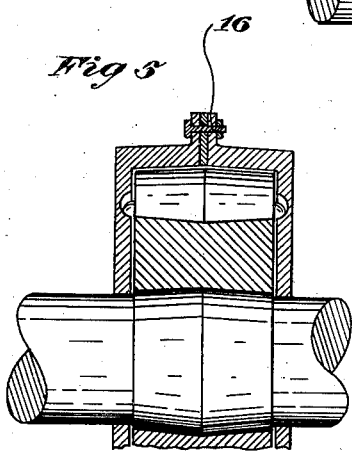
Figure 5 is a sectional view, corresponding to a section of Figure 4, illustrating a modified construction of housing.

The modified form shown in Figure 5, corresponds with the form shown in Figures 3 and 4, with the exception that instead of using the free ring surrounding the rollers or balls, the side walls of the casing itself project over the rollers or balls and are connected by a bolt 16.

As shown in the drawings, the rollers, or balls, are all loosely mounted in the housing, and spaced apart, particularly as shown in Figures 1 and 3. The inner set of rollers contact with the outer set of rollers, but the inner set of rollers themselves are out of contact with each other, and the outer set of rollers are out of contact with each other.

In the rotation of the shaft, the rollers freely revolve, the outer rollers are traveling in the track channel, and the inner rollers moving in synchronization with the outer rollers. This free movement of the rollers eliminates the friction that exists in the ordinary construction of roller or ball bearing, where the rollers are journaled or the balls themselves confined in individual housings.

In the use of the word "rollers" in the claims, I include balls, which constitute a form of roller.

In the form shown in Figure 2 a sleeve 17 closely surrounds the shaft and the outer face of the sleeve being hollowed toward the center to conform with the outer circumference of the rollers 4.

I claim:

A shaft bearing comprising in combination with a rotatable shaft and a sleeve closely surrounding said shaft, with the outer periphery of said sleeve hollowed toward the center of the sleeve; of a plurality of rollers of greater cross-section at the center than toward the ends whereby to form peripheries fitted to the periphery of the sleeve, each of said rollers having an extension on each end thereof co-axial with said rollers and having the outer ends thereof provided with a circular, headed portion of enlarged diameter, a pair of plates mounted one on each side of said rollers and surrounding said shaft, each of said plates having an annular recess therein concentric with said shaft and adapted to receive the headed portions of said roller extensions, a plurality of freely rotating disks mounted in said annular recesses in said plates and positioned to rollingly support the headed portions of said extensions within said annular recesses in said plates, and a ring positioned intermediate of said plates and surrounding said rollers, said ring being in contact with said rollers and being unconnected with said plates so as to freely rotate with said plates, said ring being inwardly hollowed to fit the center enlargement of said rollers.

ALLEN J. FRENCH.